United States Patent
Omo et al.

[11] Patent Number: 6,122,699
[45] Date of Patent: *Sep. 19, 2000

[54] DATA PROCESSING APPARATUS WITH BUS INTERVENTION MEANS FOR CONTROLLING INTERCONNECTION OF PLURAL BUSSES

[75] Inventors: Shinichi Omo; Akira Kuronuma; Takayuki Murata; Chikatoshi Okubo; Masahiko Umezawa, all of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/865,057

[22] Filed: May 29, 1997

[30] Foreign Application Priority Data

Jun. 3, 1996 [JP] Japan ................................. 8-162297
Nov. 29, 1996 [JP] Japan ................................. 8-333102

[51] Int. Cl.[7] ................................................ G06F 13/00
[52] U.S. Cl. ............................ 710/131; 710/22; 710/128
[58] Field of Search ................................. 395/800, 842, 395/847, 477; 711/150; 710/13–35, 48, 126–131, 260

[56] References Cited

U.S. PATENT DOCUMENTS

| | | | |
|---|---|---|---|
| 3,997,875 | 12/1976 | Boeren | 340/172 X |
| 4,443,846 | 4/1984 | Adcock | 364/200 |
| 4,467,449 | 8/1984 | Takahashi et al. | |
| 4,764,865 | 8/1988 | Temple, III | 711/150 |
| 4,912,632 | 3/1990 | Gach et al. | 364/200 |
| 5,239,629 | 8/1993 | Miller et al. | 395/325 |
| 5,437,042 | 7/1995 | Culley et al. | 395/800 |
| 5,481,678 | 1/1996 | Kondo et al. | 395/280 |
| 5,619,726 | 4/1997 | Secomi et al. | 395/842 |
| 5,638,521 | 6/1997 | Buchala et al. | 395/311 |
| 5,652,915 | 7/1997 | Jeter et al. | 395/872 |
| 5,671,393 | 9/1997 | Yamaki et al. | 395/477 |
| 5,745,732 | 4/1998 | Cherukuri et al. | 395/495 |
| 5,826,106 | 10/1998 | Pang | 395/845 |

*Primary Examiner*—Christopher B. Shin
*Attorney, Agent, or Firm*—Fitzpatrick, Cella, Harper & Scinto

[57] ABSTRACT

This invention has as its object to improve the net processing speed by appropriately assigning the DMA processing time for attaining high-speed processing using hardware, and the software execution time of a CPU. By interrupting the operation of one of a CPU and a DMA processor only when a device such as an external D-RAM shared by processors such as the CPU, DMA processor, and the like, is to be accessed, the CPU operation and the DMA processing are substantially parallelly executed, thereby improving the net processing speed.

4 Claims, 11 Drawing Sheets

DATA PROCESSING APPARATUS WITH BUS INTERVENTION MEANS FOR CONTROLLING INTERCONNECTION OF PLURAL BUSSES

BACKGROUND OF THE INVENTION

1. Field of the Invention

The present invention relates to a data processing apparatus and, more particularly, to a data processing apparatus suitable for attaining high-speed processing of print data in a recording apparatus, which receives image data transferred from a host computer and prints the received image data.

2. Related Background Art

In recent years, as the resolutions and speeds of recording apparatuses increase, the volume of print data transferred from a host computer is becoming very large. In a method of processing such large volume of print data, high-speed processing is realized by increasing the speed and the number of bits (e.g., from 8 bits to 16 bits or to 32 bits) of CPUs, or by exploiting data processing using hardware based on DMA (direct memory access) processing.

For example, in the prior art (prior art 1) shown in FIG. 5, when a DMA processor starts processing, it interrupts the operation of a CPU by requesting the use of a bus of it, and executes DMA upon gaining access to the bus. In this case, the operation of the CPU and DMA processing are alternately executed, and an improvement in total processing speed is limited.

On the other hand, in a system that executes DMA processing while a CPU is accessing a program ROM as in the prior art (prior art 2) shown in FIG. 6, if the CPU is executing a command such as multiplications and divisions that require a long processing time, the processing interval of DMA is prolonged.

More specifically, control for allocating the DMA processing time for realizing high-speed processing by hardware, and the software execution time of the CPU, poses a problem.

Various recording apparatuses such as a printer, copying machine, facsimile apparatus, wordprocessor, and the like use CPUs (Central Processing Units). The CPU operates in accordance with a program that describes the processing contents.

FIG. 8 is a block diagram showing a conventional recording apparatus.

A CPU 101 has a WAIT function, and an ASIC (Application Specific IC) 103 and a ROM (Read Only Memory) 104 are connected to the CPU 101 via a system bus 102. The ROM 104 stores a control program for managing the entire recording apparatus, font information, and the like. A RAM (Random Access Memory) 106 is connected to the ASIC 103 via a RAM bus 105. The RAM 106 is used as, e.g., a print control work area for writing and reading information. The ASIC 103 is used for driving the ROM 104 and the RAM 106, and performing print control, and the like.

Furthermore, the CPU 101 and the ASIC 103 exchange a bus control signal 107. The ASIC 103 and the ROM 104 exchange a ROM control signal 108. The ASIC 103 and the RAM 106 exchange a RAM control signal 109.

FIG. 9 is a timing chart when the CPU 101 accesses the ROM 104 in the arrangement shown in FIG. 8. The CPU 101 generates an address, a signal indicating the type of memory access (i.e., a signal indicating a read/write signal), and the like. Subsequently, the CPU 101 asserts a signal indicating that the address, the type of memory access, and the like are determined (to be referred to as a "signal ASX" hereinafter) (timing $t_{31}$), sets the data direction to be the input, and asserts a signal DSX. The CPU 101 then determines the bus cycle time based on a signal WAIT (to be described later), and negates the signal DSX after an elapse of a predetermined period of time. At the same time, the CPU 101 receives data and negates the signal ASX (timing $t_{33}$), thus preparing for the next access.

Upon reception of the signal ASX from the CPU 101, the ASIC 103 determines the memory device to be accessed based on the address at that time, determines the type of memory access based on the signal indicating the type of memory access, and supplies a predetermined memory control signal to a predetermined memory device. At this time, when the selected device has a low access speed, the ASIC 103 asserts a signal WAIT for requesting to postpone the memory access, and negates the signal WAIT at the timing at which the selected memory device can respond to the memory access. Upon reception of the control signal from the ASIC 103, the selected memory device reads out data from an appropriate address (timing $t_{32}$).

FIG. 10 is a timing chart when the CPU 101 accesses the RAM 106. In this case, the RAM 106 comprises a D-RAM, and its access speed is faster than the bus cycle. Hence, in the following description, the RAM 106 will be referred to as a D-RAM.

In this case, the CPU 101 generates the address of the D-RAM and a signal indicating a read, and thereafter, asserts a signal ASX. Furthermore, the CPU 101 sets the data direction to be the input, and asserts a signal DSX. Upon reception of the signal ASX from the CPU 101, the ASIC 103 determines the D-RAM to be accessed on the basis of the address at that time, sets a ROW address at the address of the D-RAM (timing $t_{41}$), and asserts a signal RASX. After an elapse of a pre-set period of time, the ASIC 103 sets a COLUMN address at the address of the D-RAM (timing $t_{42}$), and asserts a signal CASX (timing $t_{43}$). At the same time, the ASIC 103 asserts a signal OEX as a command for requesting the D-RAM to output data.

Upon reception of the control signal 109 from the ASIC 103, the D-RAM outputs the contents at the designated address onto the RAM bus 105 (timing $t_{44}$). At this time, since the access speed of the D-RAM is faster than the bus cycle, as described above, the ASIC 103 negates the individual control signals at predetermined timings while negating the signal WAIT, thus returning the data on the RAM bus 105 to the system bus 102. When the CPU 101 confirms at the WAIT signal sampling timing that the signal WAIT is negated, it negates the signals ASX and DSX (timing $t_{45}$), and at the same time, latches the data, thus ending the bus cycle.

FIG. 11 is a timing chart for explaining the outline of the DMA (direct memory access) of the ASIC 103. The DMA is processing in which the ASIC 103 directly accesses the D-RAM using the released RAM bus 105 in a bus cycle (e.g., at the time of ROM access or the like) in which the CPU 101 uses only the system bus 102.

The CPU 101 generates an address and a signal indicating the type of memory access (read or write access, or the like), and asserts a signal indicating that the address, the type of memory access, and the like are determined (e.g., a signal ASX). The CPU 101 then sets the data direction to be the input, and asserts a signal DSX (timing $t_{51}$). The CPU 101 determines the bus cycle time on the basis of a signal WAIT, and negates the signal DSX after an elapse of a predetermined period of time (timing $t_{55}$). At the same time, the CPU 101 receives data, and negates the signal ASX to prepare for the next access. Upon reception of the signal ASX from the CPU 101, the ASIC 103 determines the memory device to be accessed based on the address at that time, determines the type of memory access based on the signal indicating the type of memory access, and supplies a predetermined control signal to a predetermined memory device.

At this time, when the selected device has a low access speed, the ASIC 103 asserts a signal WAIT for requesting to postpone the memory access, and negates the signal WAIT at the timing at which the selected memory device can respond to the memory access. Upon reception of the control signal from the ASIC 103, the selected memory device reads out data from an appropriate address. If a DMA request is generated inside the ASIC 103, the ASIC 103 generates the next RAM access using the RAM bus 105 released simultaneously with the above-mentioned operation (at this time, assume that the access speed of the D-RAM is faster than the bus cycle).

The ASIC determines the D-RAM to be accessed on the basis of the address the DMA to which is requested, sets a ROW address of the DMA of the D-RAM (timing $t_{50}$), and asserts a signal RASX (timing $t_{51}$). Thereafter, after an elapse of a pre-set period of time, the ASIC 103 sets a COLUMN address of the DMA at the address of the D-RAM (timing $t_{52}$), and asserts a signal CASX (timing $t_{53}$). In this case, the ASIC 103 asserts a signal OEX that requests the D-RAM to output data simultaneously with asserting the signal CASX (timing $t_{53}$). Upon reception of the control signal 109 from the ASIC 103, the D-RAM outputs the contents at the designated address onto the RAM bus 105. The ASIC 103 latches the data on the RAM bus 105 at that time (timing $t_{54}$), and transfers the latched data to the internal block that generated the DMA request.

However, in the above-mentioned prior art, when the CPU 101 issues a loop command (a continuous RAM access command such as a block transfer command or the like without any command fetch) while the DMA request is generated, the ASIC 103 postpones the DMA until the loop command ends, and executes the DMA when the RAM bus 105 is released.

However, since the recording apparatus involves many DMA processing operations with limited processing times like recording head control DMA processing, and the like, the DMA cannot be postponed for a long period of time.

In the prior art, in order to avoid the above-mentioned problem, the loop command is inhibited from being used, or the RAM bus 105 is forcibly released by executing bus intervention or arbitration. However, when the method of inhibiting the use of the loop command is used, the loop command with a great merit such as a block transfer command or the like that allows high-speed transfer of data cannot be used, thus posing another problem. If bus intervention is used, a complex bus intervention circuit is required, and DMA efficiency is impaired due to the presence of the negotiation time for bus intervention.

The present invention has been made in consideration of the above-mentioned problems, and has as its object to provide a recording apparatus which allows an ASIC to execute DMA even when a RAM bus is not released.

SUMMARY OF THE INVENTION

A data processing apparatus according to one embodiment of the present invention comprises:

a first processor connected to a first bus;

a second processor connected to a second bus;

a third processor shared by the first and second processors and connected to a third bus; and bus intervention unit for attaining connections between required buses using switching unit for logically connecting the first, second, and third buses to each other, the first and second processors have an identification signal indicating an in-use state of the third bus, and when one of the first and second processors uses the third processor, the bus intervention unit determines if the third processor can be used by checking the identification signal from the other of the first and second processors, and when the other of the first and second processors is using the third processor, the bus intervention unit issues a use interrupt signal to the one of the first and second processors, switches the buses after the identification signal from the other of the first and second processors ceases to indicate the in-use state, and instructs the one of the first and second processors to use the third processor.

A data processing apparatus according to one embodiment of the present invention comprises a first processor having an independent first bus, a second processor having an independent second bus, a third bus having a third bus shared by the first and second processors, and bus intervention unit for attaining connections between required buses using switching unit for logically connecting the first, second, and third buses to each other, the first processor comprises first access request signal generation unit for generating a first access request signal for requesting an access to the third processor, the second processor comprises second access request signal generation unit for generating a second access request signal for requesting an access to the third processor, the bus intervention unit receives the first access request signal generated by the first access request signal generation unit and the second access request signal generated by the second access request signal generation unit, generates a second access stop request signal for requesting the second processor to stop the access, and a second in-use indication signal for informing the second processor that the third processor is in use, outputs the second access stop request signal and the second in-use indication signal to the second processor, generates a first access stop request signal for requesting the first processor to stop the access, and a first in-use indication signal for informing the first processor that the third processor is in use at proper timings, and outputs the first access stop request signal and the first in-use indication signal to the first processor, when the first access request signal is input from the first access request signal generation means of the first processor to the bus intervention unit:

if the second processor is not in operation, the bus intervention unit generates the second in-use indication signal; and if the second processor is in operation, the bus intervention unit generates the second access stop request signal, generates the second in-use indication signal and stops generation of the second in-use indication signal when the second processor ceases to operate, and when the second access request signal is input from the second access request signal generation unit of the second processor to the bus intervention unit:

if the first processor is not in operation, the bus intervention unit generates the first in-use indication signal; and if the first processor is in operation, the bus intervention unit generates the first access stop request signal, generates the first in-use indication signal and stops generation of the first in-use indication signal when the first processor ceases to operate.

DESCRIPTION OF THE PREFERRED EMBODIMENTS

The present invention provides a data processing apparatus which can improve the net processing speed by substantially parallelly executing the CPU operation and the DMA processing in such a manner that only when a device such as an external RAM (to be described later) shared by the individual processors such as a CPU, DMA processor, and the like is to be accessed, the operation of the one of the CPU and DMA processor is interrupted.

In addition, in a recording apparatus in which a ROM and an ASIC are connected to a CPU having a WAIT function via a system bus, and a RAM is connected to the ASIC via a RAM bus, a RAM access by the ASIC is executed without being synchronized with the bus cycle of the CPU, and when the CPU requests a RAM access, the CPU gains access to the RAM bus.

With this arrangement, when the CPU makes a RAM access for executing a loop command or the like, the execution is done independently of the bus cycle. On the other hand, when the ASIC accesses the RAM, it can directly access the RAM within the bus cycle without being influenced by an ASIC access from the CPU. Accordingly, the RAM access by the ASIC can be executed without being influenced by execution of the loop command by the CPU.

More specifically, if a RAM access by the ASIC is attained by DMA, and a RAM access by the CPU is attained by a continuous RAM access without any command fetch, when the CPU uses a loop command, the loop command can be executed independently of the bus cycle of the CPU, while the DMA to the RAM from the ASIC can be made within the bus cycle. Hence, the DMA can be executed without being influenced by execution of the loop command by the CPU.

The contents will be described hereinafter in detail.

(First Embodiment)

Figure 1:
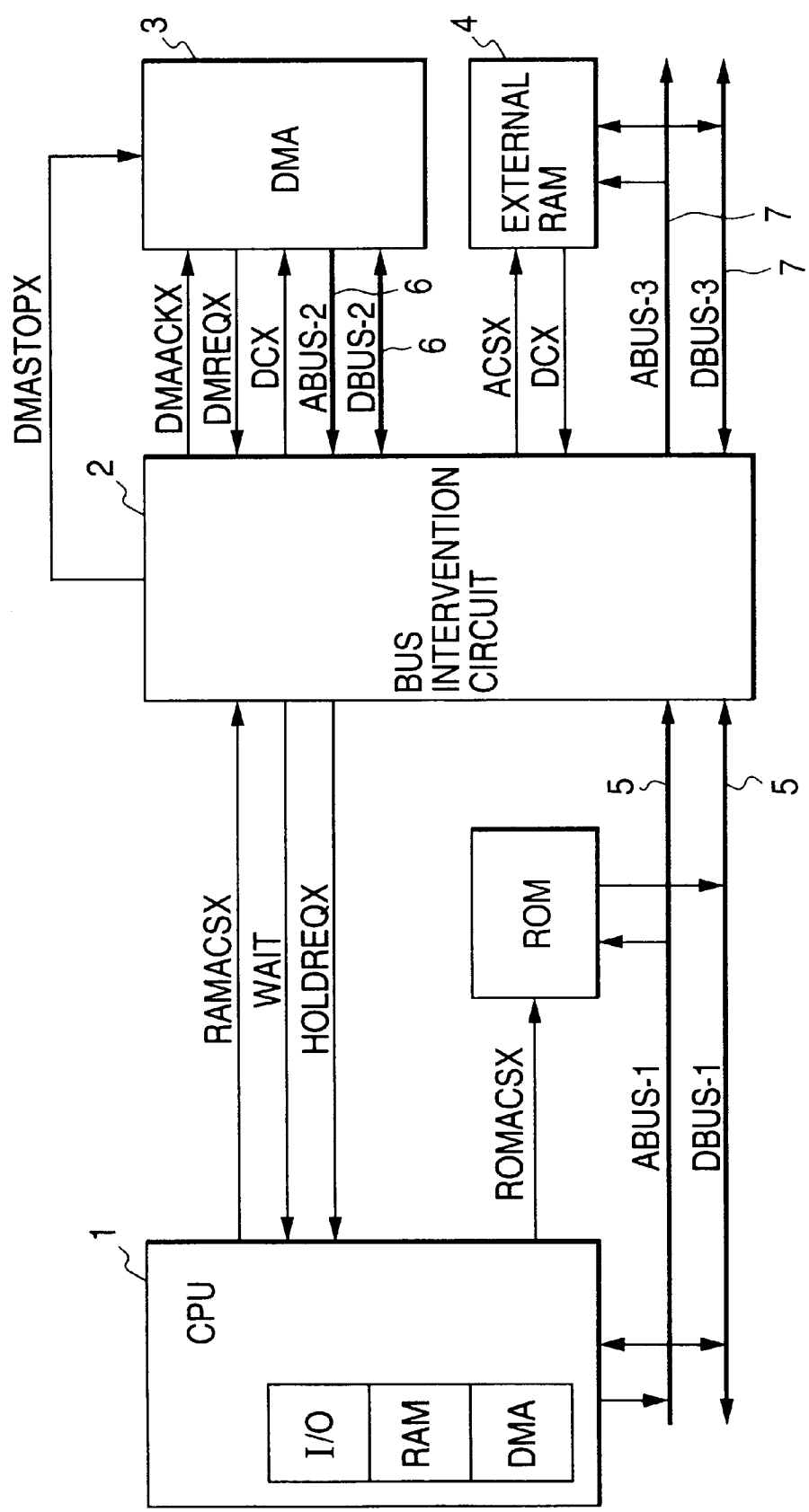
FIG. 1 is a circuit block diagram showing principal part of a data processing apparatus according to the present invention.

A data processing apparatus for a recording apparatus according to the first embodiment of the present invention will be explained below. FIG. 1 is a circuit block diagram showing principal part of a data processing apparatus of the present invention. Referring to FIG. 1, independent buses 5 (data bus, address bus, and the like; DBUS1, ABUS1), and buses 6 (data bus, address bus, and the like; DBUS2, ABUS2) respectively connected to a CPU 1 serving as a first processor and a DMA processor 3 serving as a second processor are intervened and switched by a bus intervention circuit 2, and are connected to buses 7 (data bus, address bus, and the like; DBUS3, ABUS3) of an external RAM 4 shared by the first and second processors. Note that the CPU 1 preferably comprises a so-called one-chip CPU including peripheral functions such as a RAM, a DMA function, an I/O (input/output interface), and the like.

In the recording apparatus of the present invention, the CPU 1 controls the recording apparatus (e.g., the overall control such as carriage motor control, paper feed motor control, print control, and the like), and, e.g., setting of the operation mode of the DMA processor 3.

On the other hand, the DMA processor 3 is a processor for executing, using hardware, processing (e.g., data input from a host computer, print data conversion, and print head control) which cannot be attained by software processing since too long an execution processing time is required.

Note that the external RAM is shared as a work area of the CPU 1, a storage processing area of print data, and the like. Not only the external RAM is physically shared, but also the stored data can be shared.

Figure 2:
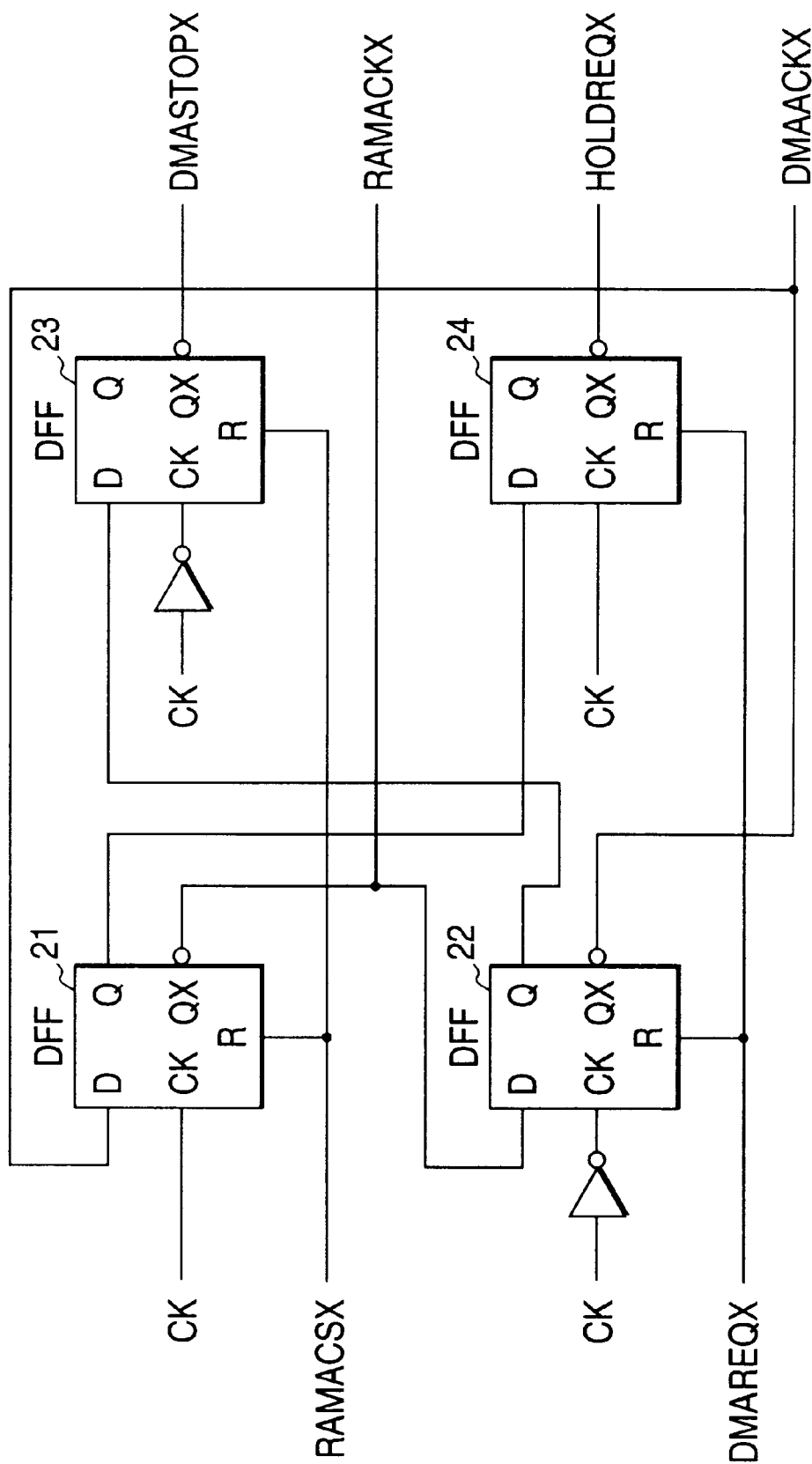
FIG. 2 is a circuit diagram showing an operation timing generation circuit in a bus intervention circuit of the present invention.

FIG. 2 is a circuit diagram showing an operation timing generation circuit in the bus intervention circuit of the present invention. Note that FIG. 2 illustrates the operation timing generation circuit alone particularly associated with the present invention.

Referring to FIG. 2, each of D-type flip-flops 21, 22, 23, and 24 (to be respectively referred to as a DFF21, DFF22, DFF23, and DFF24 hereinafter) has a D terminal (input terminal), CK terminal (clock input terminal), R terminal (reset terminal), Q terminal (output terminal), and QX terminal ($\overline{Q}$ output terminal).

Signals input to or output from each DFF are as follows:
(1) CK: A clock signal. The DFF21 and DFF24 of the bus intervention circuit 2 operate in response to the leading edge of this signal when they are not in the reset state, and the DFF22 and DFF23 operate in response to the trailing edge of this signal when they are not in the reset state.
(2) RAMACSX: A signal input from the CPU 1 to the R terminals of the DFF21 and DFF23 of the bus intervention circuit 2; this signal serves as an access request signal from the CPU 1 to the external RAM 4.
(3) DMAREQX: A signal input from the DMA processor 3 to the R terminals of the DFF22 and DFF24 of the bus intervention circuit 2; this signal serves as an access request signal from the DMA processor 3 to the external RAM 4.
(4) DMASTOPX: A signal output from the QX terminal of the DFF23 of the bus intervention circuit 2 to the DMA processor 3; this signal serves as an access stop request signal to the DMA processor 3.

(5) RAMACKX: A signal output from the QX terminal of the DFF21 of the bus intervention circuit 2 to the DMA processor 3; this signal indicates that the CPU 1 is using the external RAM 4.

(6) HOLDREQX: A signal output from the QX terminal of the DFF24 of the bus intervention circuit 2 to the CPU 1; this signal serves as an access stop request signal to the CPU 1.

(7) DMAACKX: A signal output from the QX terminal of the DFF22 of the bus intervention circuit 2 to the DMA processor 3; this signal indicates that the DMA processor 3 is using the external RAM 4.

Figure 3A:
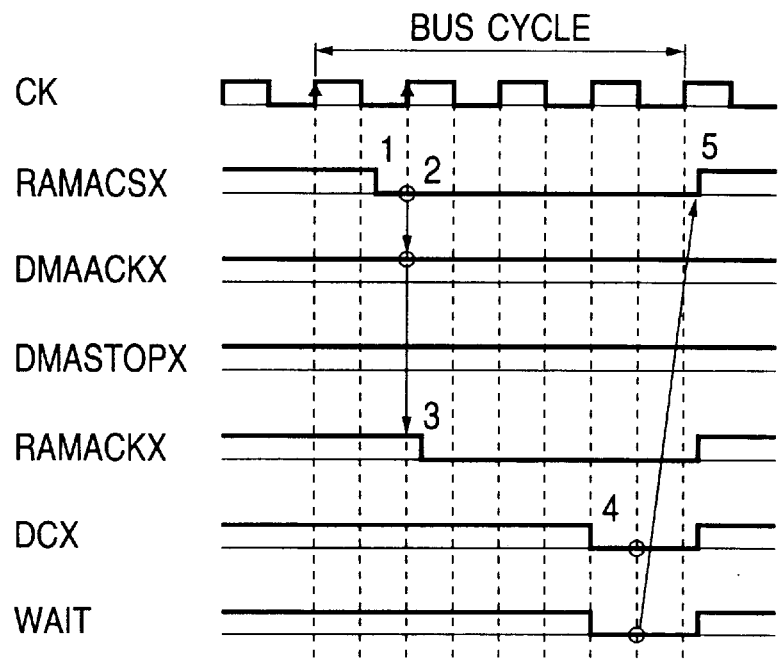
FIGS. 3A and 3B are timing charts for explaining the operation of an embodiment of the present invention.
Figure 3B:
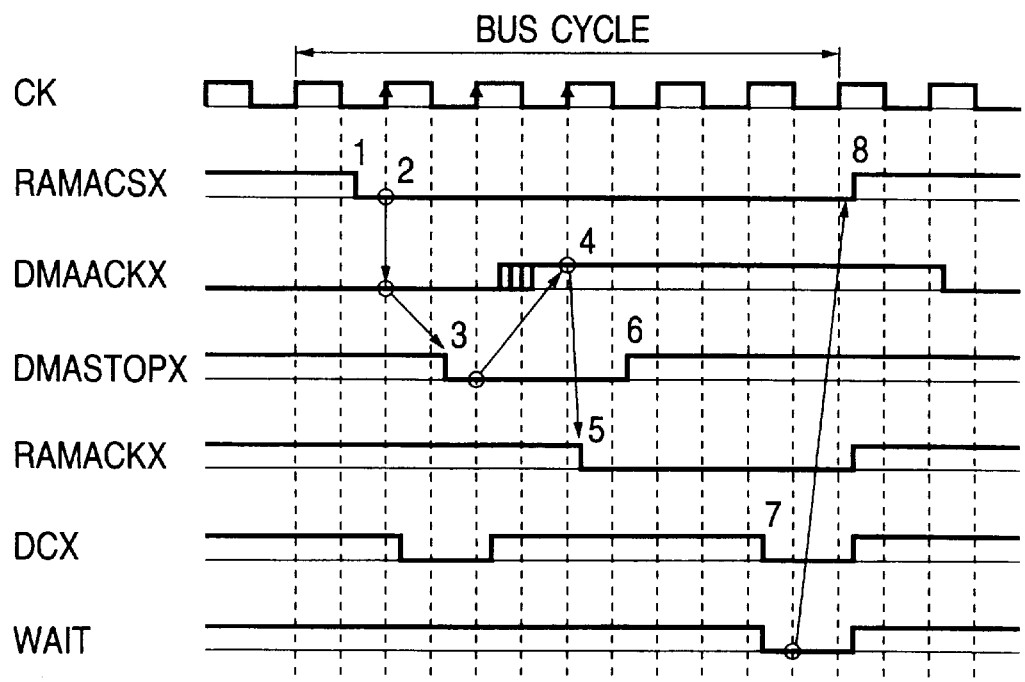
Figure 4A:
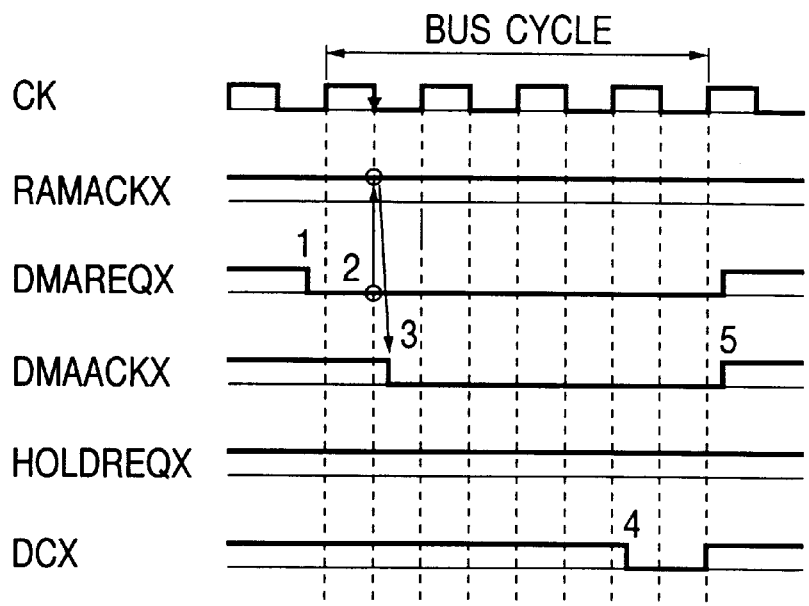
FIGS. 4A and 4B are timing charts for explaining the operation of an embodiment of the present invention.
Figure 4B:
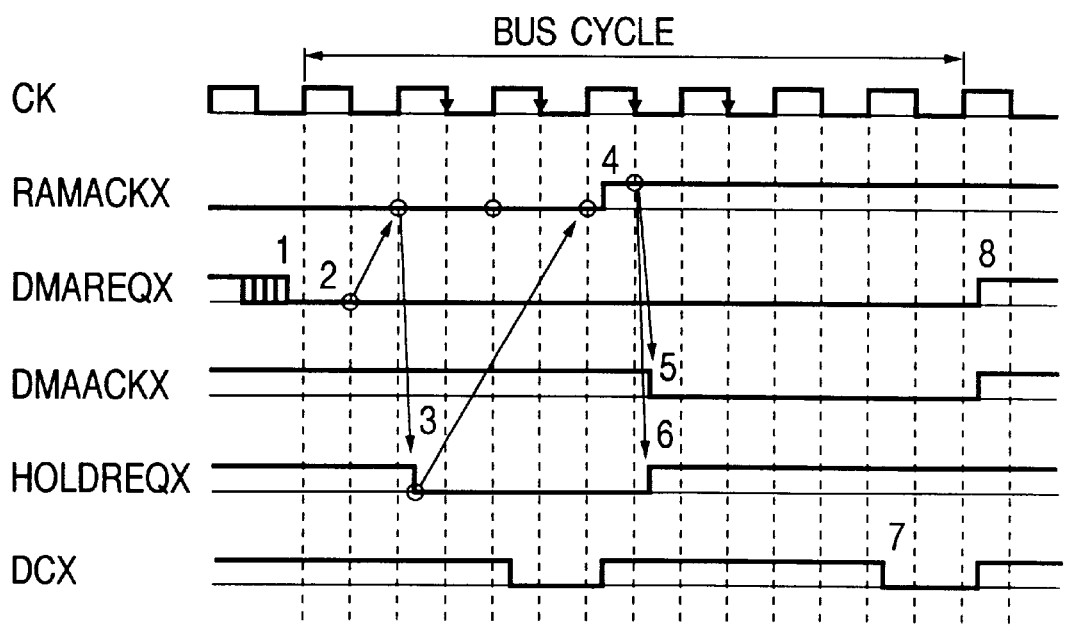
Figure 5:
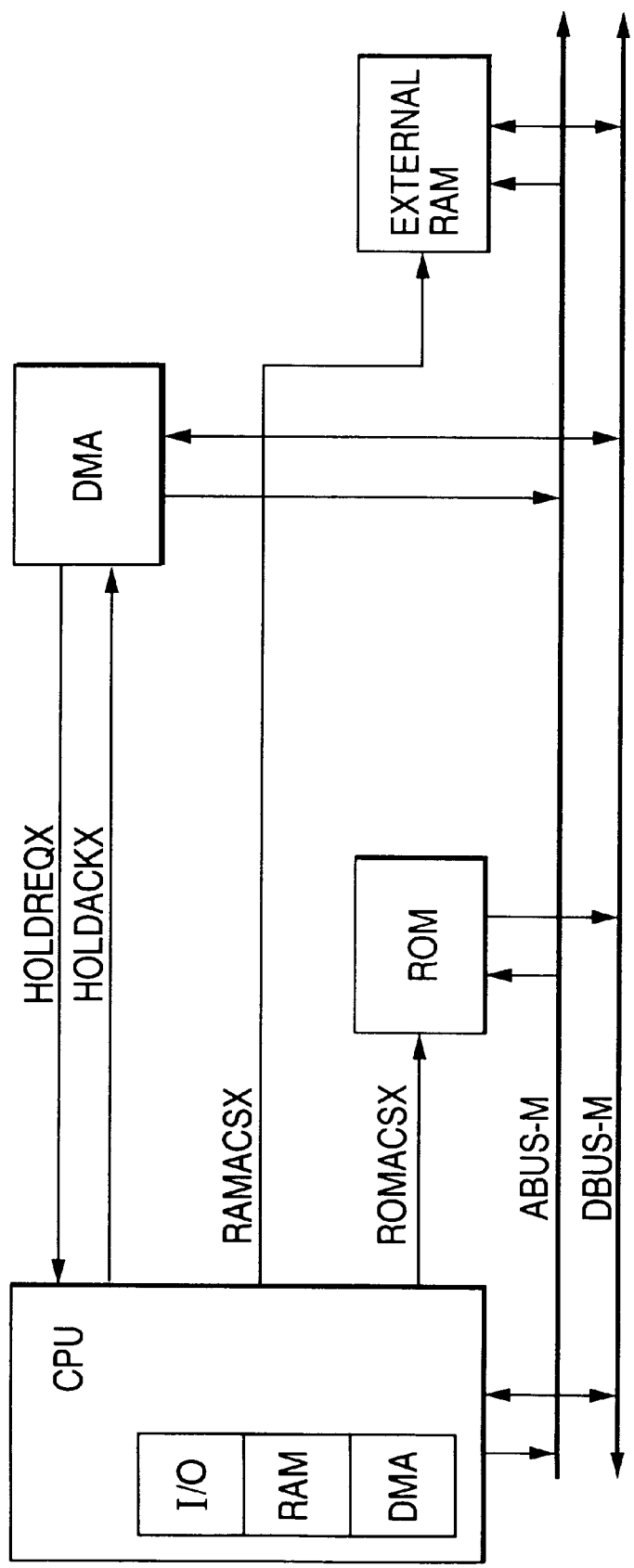
FIG. 5 is a circuit block diagram of the prior art (prior art 1)
Figure 6:
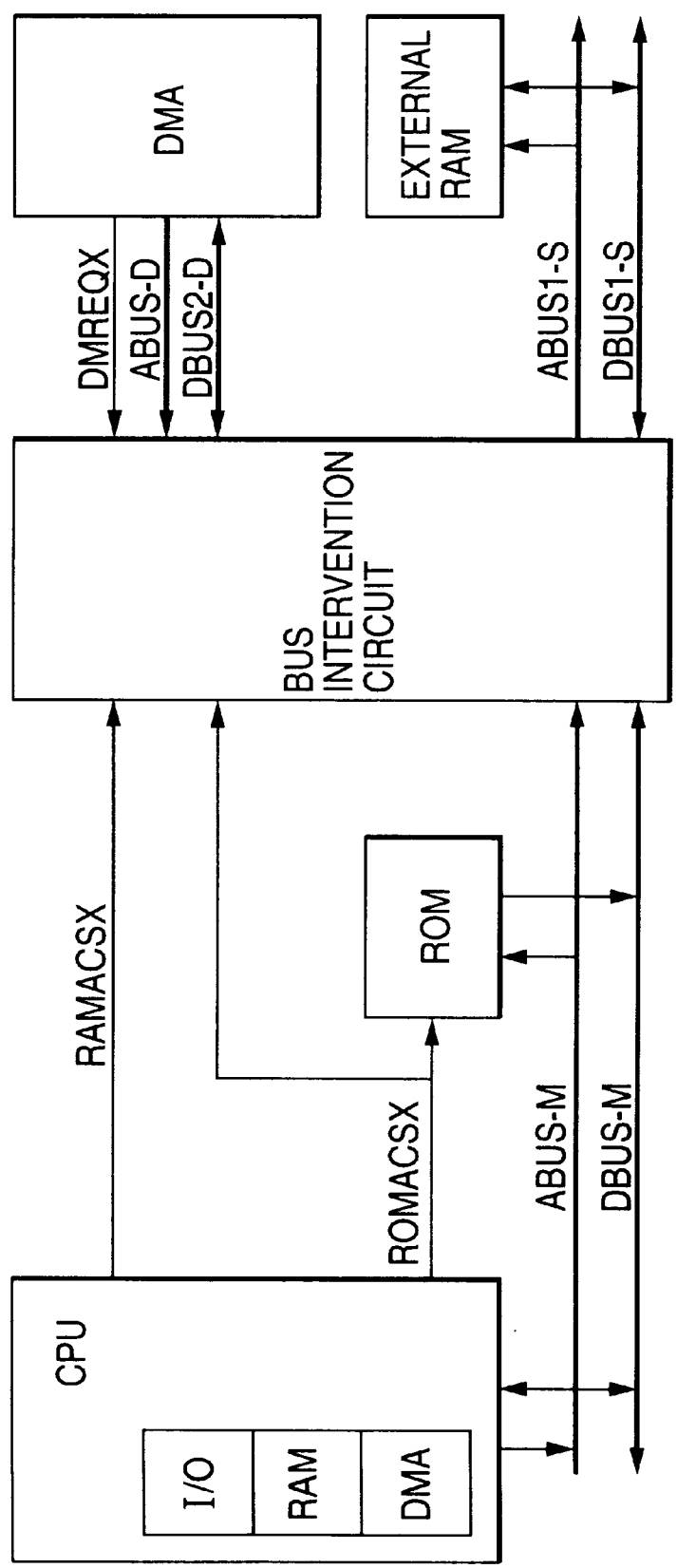
FIG. 6 is a circuit block diagram of the prior art (prior art 2)

FIGS. 3A, 3B, 4A and 4B are timing charts for explaining the operation of the operation timing generation circuit of the present invention. FIG. 3A is a timing chart when the DMA processor 3 stands idle, FIG. 3B is a timing chart when the DMA processor 3 is in operation, FIG. 4A is a timing chart when the CPU 1 stands idle, and FIG. 4B is a timing chart when the CPU 1 is in operation. These states will be explained below.

In FIG. 3A, since the DMA processor 3 lies idle in the initial state, the signal DMAREQX is "H (High)", the DFF22 and DFF24 are in the reset state, and the QX output (DMAACKX) of the DFF22 and the QX output (HOLDREQX) of the DFF24 are "H" independently of the inputs to their D and CK terminals. Since the signal RAMACSX is "H" before the CPU 1 accesses the external RAM 4, the DFF21 and DFF23 are in the reset state, and the QX output (RAMACKX) of the DFF21 and the QX output (DMASTOPX) of the DFF23 are "H" independently of the inputs to their D and CK terminals.

At timing (1), the CPU 1 sets the signal RAMACSX at "L (Low)" to access the external RAM 4.

At timing (2) (the leading edge of the signal CK input after timing (1)), it is checked if the signal DMAACKX is "H" so as to check if the DMA processor 3 is using the external RAM 4. As described above, since the signal DMAACKX as the QX output of the DFF22 is "H", it can be determined that the DMA processor 3 is not using the external RAM 4. More specifically, such determination can be done when the signal RAMACKX changes from "H" to "L" at timing (3), as will be described below.

At timing (3) (the same timing as timing (2)), the signal RAMACKX goes "L". More specifically, since the signal RAMACSX input to the R terminal of the DFF21 goes "L" at the above-mentioned timing (1), the reset state of the DFF21 is canceled (i.e., the DFF21 can operate in response to the signal CK). On the other hand, since the D terminal of the DFF21 connected to the signal DMAACKX is "H", the QX output of the DFF21 (i.e., RAMACKX) changes from "H" to "L" in response to the leading edge of the signal CK. This change informs the DMA processor 3 that the CPU 1 is using the external RAM.

At timing (4), accesses to the external RAM 4 are made during the "L" period of the signal RAMACKX, and the external RAM 4 outputs an "L" signal DCX indicating the end of accesses. Also, the bus intervention circuit outputs an "L" signal WAIT for prolonging the access period to the CPU 1 at the same timing as the signal DCX.

At timing (5), the signal RAMACKX goes "H", and accesses by the CPU 1 end.

Note that the signal DMASTOPX as the QX output of the DFF23 remains "H", as shown in FIG. 3A, since an "L" Q output of the DFF22 is input to the D terminal of the DFF23.

In FIG. 3B (when the DMA processor 3 is in operation), the signal DMAACKX is "L" in the initial state. This is for the following reason. Since the DMA processor 3 is in operation, the signal DMAREQX is "L" and, hence, the DFF22 can operate upon input of the signal CK. Initially, since the signal RAMACSX is "H", the DFF21 is in the reset state. Accordingly, the QX output of the DFF21 is "H" and, hence, the D terminal of the DFF22 is "H". As a consequence, the QX output (DMAACKX) of the DFF22 is "L" at the trailing edge of the input signal CK. As described above, since the signal RAMACSX is "H", the DFF21 and DFF23 are in the reset state, and both the QX output (RAMACKX) of the DFF21 and the QX output (DMASTOPX) of the DFF23 are "H".

At timing (1), the CPU 1 sets the signal RAMACSX at "L" to access the external RAM 4.

At timing (2) (the leading edge of the signal CK input after timing (1)), it is checked if the signal DMAACKX is "L" so as to check if the DMA processor 3 is using the external RAM 4. As described above, since the signal DMAACKX as the QX output of the DFF22 is "L", it can be determined that the DMA processor 3 is using the external RAM 4. Also, although the reset state of the DFF21 is canceled by setting RAMACSX at "L" at the above-mentioned timing (1), since its D input is "L", the Q output of the DFF21 remains "L".

At timing (3) (the trailing edge of the signal CK), the signal DMASTOPX changes from "H" to "L". More specifically, since the signal RAMACSX input to the R terminal of the DFF21 is set at "L" at the above-mentioned timing (1), the reset state of the DFF23 is canceled (i.e., the DFF23 can operate in response to the trailing edge of the signal CK). Also, since the D terminal of the DFF23 connected to the Q terminal of the DFF22 is "H", the QX output (i.e., DMASTOPX) of the DFF23 changes from "H" to "L". In this manner, a stop request of the DMA processor 3 is issued.

When the DMA processor 3 stops its operation in response to the stop request of the DMA processor 3, since the signal DMAREQX goes "H", the QX output (DMAACKX) of the DFF22 goes "H", and it is confirmed that the signal DMAACKX is "H" at, e.g., timing (4) (the trailing edge of the signal CK).

At timing (5) (the same timing as timing (4)), the signal RAMACKX changes from "H" to "L" by an operation similar to that upon changing the signal RAMACKX from "H" to "L" at the above-mentioned timing (3). In this manner, the DMA processor 3 is informed that the CPU 1 is using the external RAM 4.

At timing (6) (the trailing edge of the signal CK), the signal DMASTOPX changes from "L" to "H" to cancel the stop request of the DMA processor 3 (at this time, the DMA processor 3 stands idle, and the CPU 1 can access the RAM). More specifically, at timing (4), the DMA processor 3 stops accesses to the external RAM 4, and the Q output of the DFF22 changes from "H" to "L". For this reason, the D terminal of the DFF23 is also "L". Hence, the signal DMASTOPX changes from "L" to "H" in response to the trailing edge of the above-mentioned signal CK.

At timing (7), accesses to the external RAM 4 are made, and the external RAM 4 outputs an "L" signal DCX indicating the end of accesses. Also, the bus intervention circuit outputs an "L" signal WAIT for prolonging the access period to the CPU 1 at the same timing as the signal DCX.

At timing (8), the signal RAMACKX goes "H", and accesses by the CPU 1 end.

In FIG. 4A (when the CPU 1 is not accessing the RAM), the signals RAMACKX and HOLDREQX are "H" in the initial state.

At timing (1), the DMA processor 3 sets the signal DMAREQX at "L" to access the external RAM 4.

At timing (2) (the trailing edge of the next signal CK), it is checked if the signal RAMACKX is "H". Since the signal RAMACKX is "H", it is determined that the CPU 1 is not using the external RAM 4.

At timing (3) (the same timing as timing (2), the signal DMAACKX is set at "L". That is, since the D terminal is "H" (since RAMACKX is "H"), the reset state of the DFF22 is canceled when the signal DMAREQX goes "L". Accordingly, the signal DMAACKX changes from "H" to "L" in response to the trailing edge of the next signal CK mentioned above. In this manner, the CPU 1 is informed that the DMA processor 3 is using the external RAM 4.

At timing (4), accesses to the external RAM 4 are made, and the external RAM 4 outputs an "L" signal DCX indicating the end of accesses.

At timing (5), the signal DMAREQX goes "H" to end the accesses by the DMA processor 3.

In FIG. 4B (when the CPU 1 is accessing the RAM), in the initial state, the signal RAMACKX is "L", DMAACKX is "H", and HOLDREQX is "H".

At timing (1), the DMA processor 3 sets the signal DMAREQX at "L" to access the external RAM 4.

At timing (2) (the trailing edge of the next signal CK), it is checked if the signal RAMACKX is "L". Since the signal RAMACKX is "L", it is determined that the CPU 1 is using the external RAM 4.

At timing (3) (the leading edge of the next signal CK), the signal HOLDREQX is set at "L". More specifically, since the D terminal of the DFF24 is "H" (since the Q output of the DFF21 is "H"), the reset state of the DFF24 is canceled when DMAREQX goes "L". For these reasons, the signal HOLDREQX changes from "H" to "L" in response to the trailing edge of the next CK signal described above. In this manner, an access stop request for the CPU 1 is issued.

When the CPU 1 stops accesses in response to the above-mentioned access stop request of the CPU 1, since the signal RAMACSX goes "H", the QX output (RAMACKX) of the DFF21 goes "H", and it is confirmed that RAMACKX is "H" at, e.g., timing (4) (the trailing edge of the signal CK).

At timing (5) (the same timing as timing (4), the signal DMAACKX changes from "H" to "L" by the same operation as that upon changing DMAACKX from "H" to "L" at the above-mentioned timing (3) in FIG. 4A. In this manner, the CPU 1 is informed that the DMA processor 3 is using the external RAM 4.

At timing (6) (the same timing as timing (4), the signal HOLDREQX changes from "L" to "H" to cancel the stop request to the CPU 1 (at this time, the CPU 1 stands idle, and the DMA processor 3 can access the RAM). More specifically, at timing (4), the CPU 1 stops accesses to the external RAM 4, and the Q output of the DFF21 is "L". For this reason, the D terminal of the DFF24 is also "L". Hence, the signal HOLDREQX changes from "L" to "H" in response to the trailing edge of the above-mentioned signal CK.

At timing (7), accesses to the external RAM 4 are made, and the external RAM 4 outputs an "L" signal DCX indicating the end of accesses.

At timing (8), the signal DMAREQX goes "H" to end the accesses by the DMA processor 3.

If a signal HOLDX (not shown) indicating that the CPU has come to a halt can be output, this signal may be used as the timing for canceling the stop request of the CPU 1 at timing (6).

According to the present invention, especially, when the CPU 1 comprises a so-called one-chip CPU including a DMA controller, an input/output function, and a RAM, it is effective for improving the processing speed to cancel the signal HOLDREQX as the stop signal as early as possible.

In the present invention, the CPU operation and the DMA processing can be substantially parallelly executed by stopping one of the CPU and the DMA processor only when a device such as an external RAM shared by the individual processors such as the CPU, DMA processor, and the like is to be accessed. The influence of the operation state of the other of the CPU and the DMA processor can be minimized, and the use efficiency of the shared portion can be improved, thereby improving the processing speed.

(Second Embodiment)

The second embodiment of the present invention will be described below with reference to the accompanying drawings.

Figure 7:
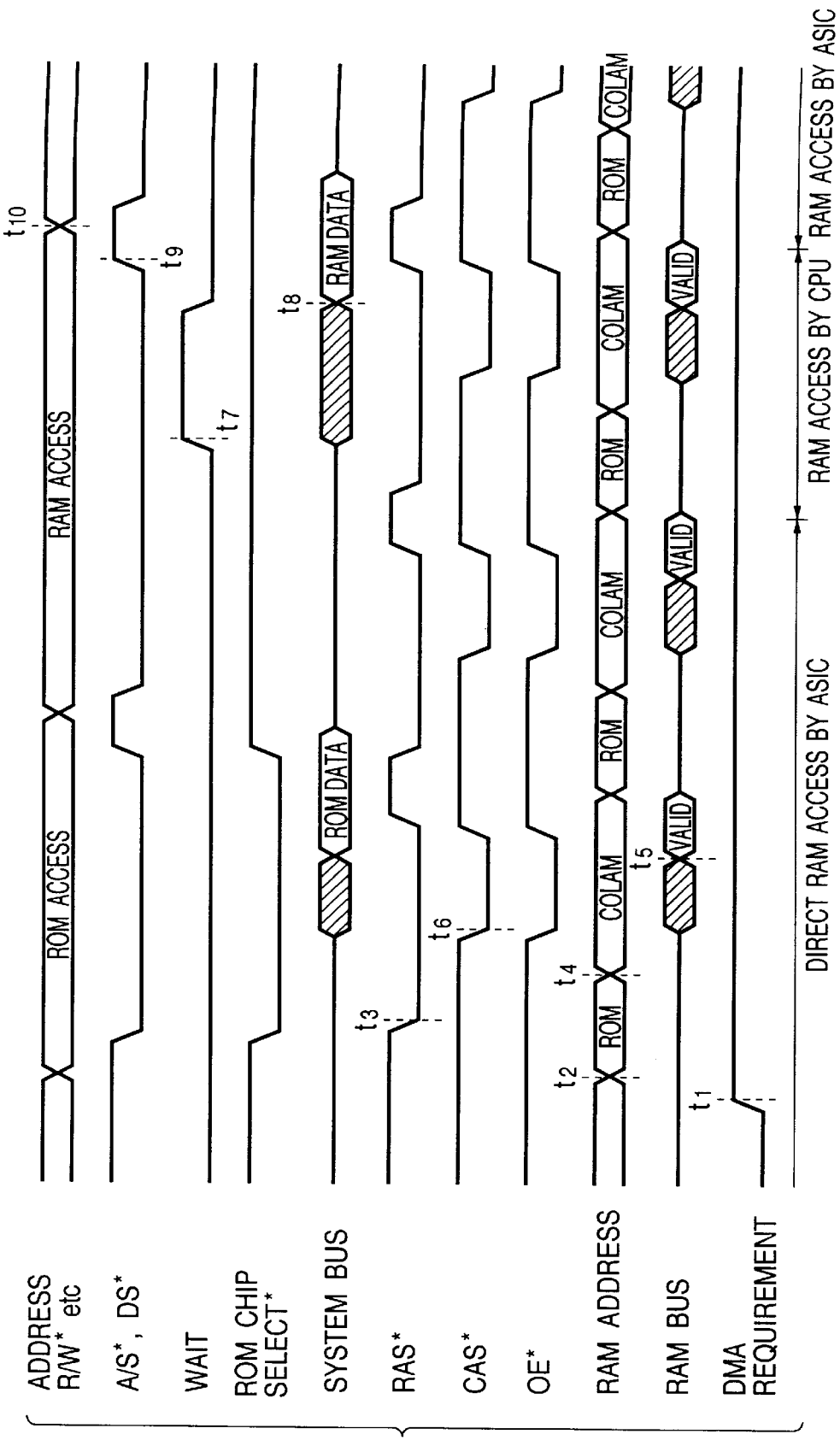
FIG. 7 is a timing chart showing the operation of a recording apparatus according to the present invention.

FIG. 7 is a timing chart showing the operation of a recording apparatus according to the present invention.

Figure 8:
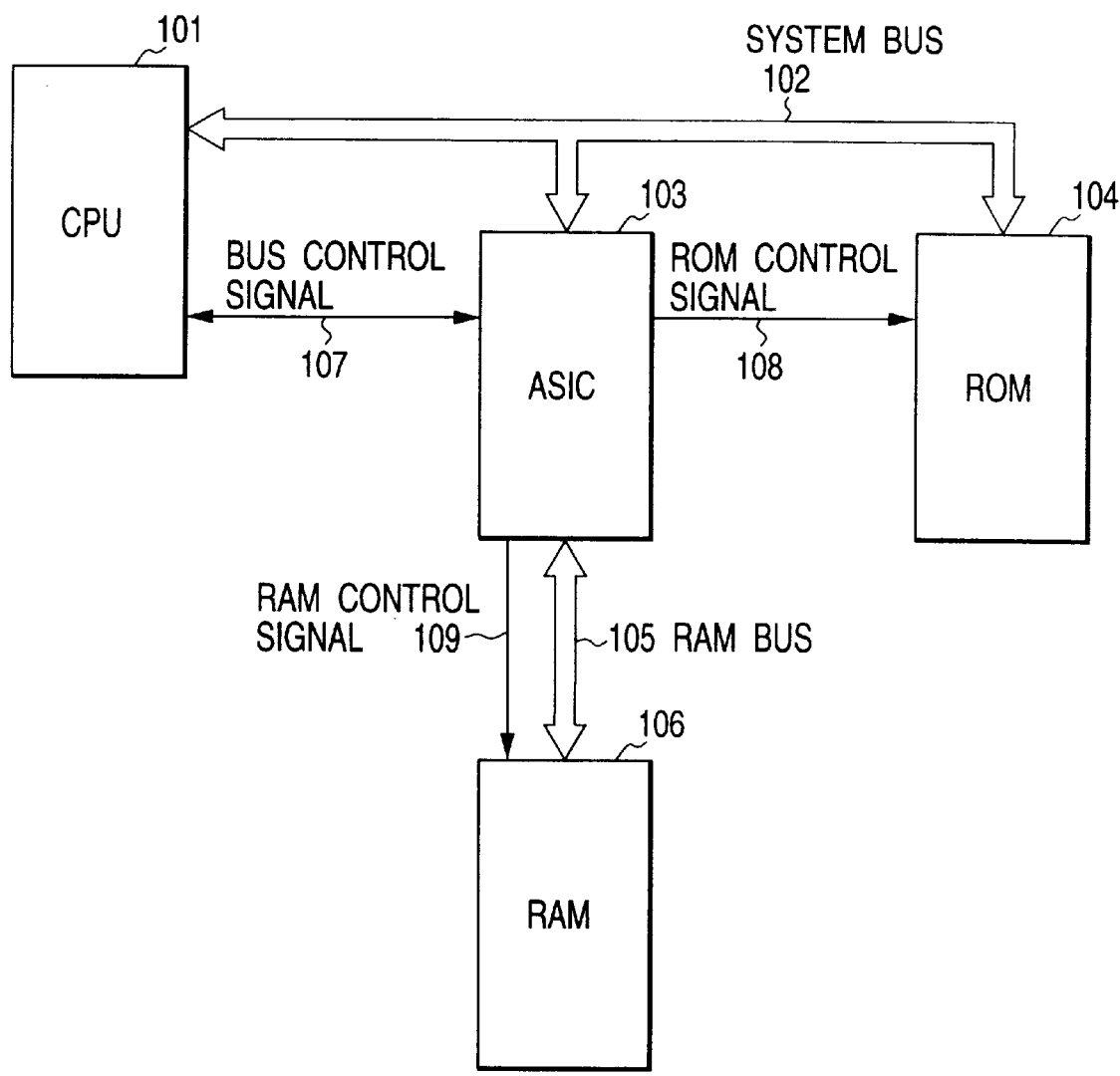
FIG. 8 is a block diagram showing a conventional recording apparatus.
Figure 9:
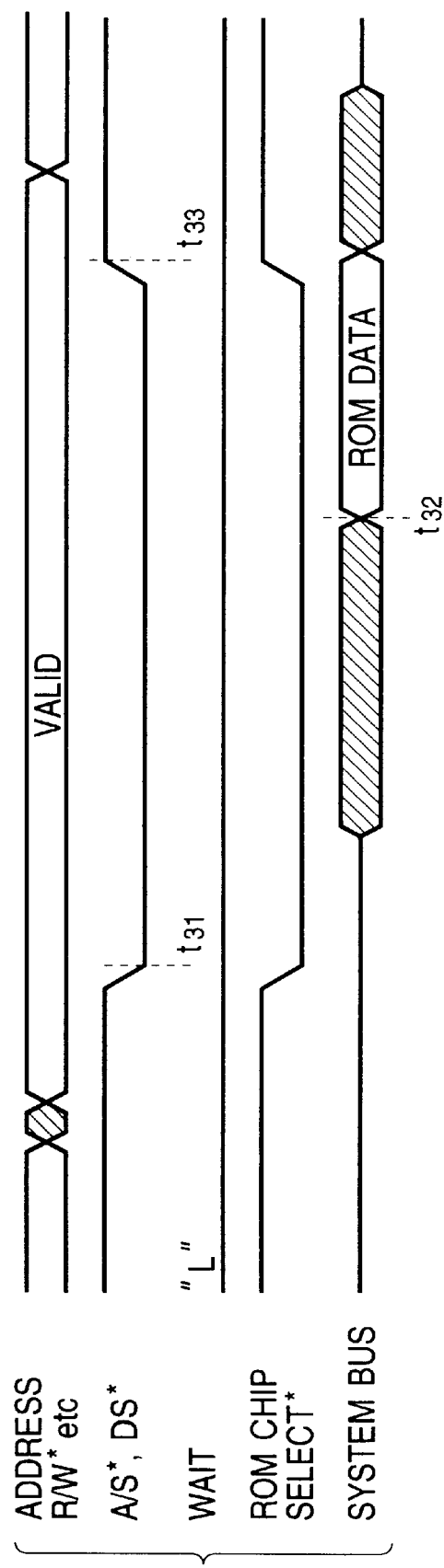
FIG. 9 is a timing chart showing the operation executed when a CPU accesses a ROM in the arrangement show in FIG. 8.
Figure 10:
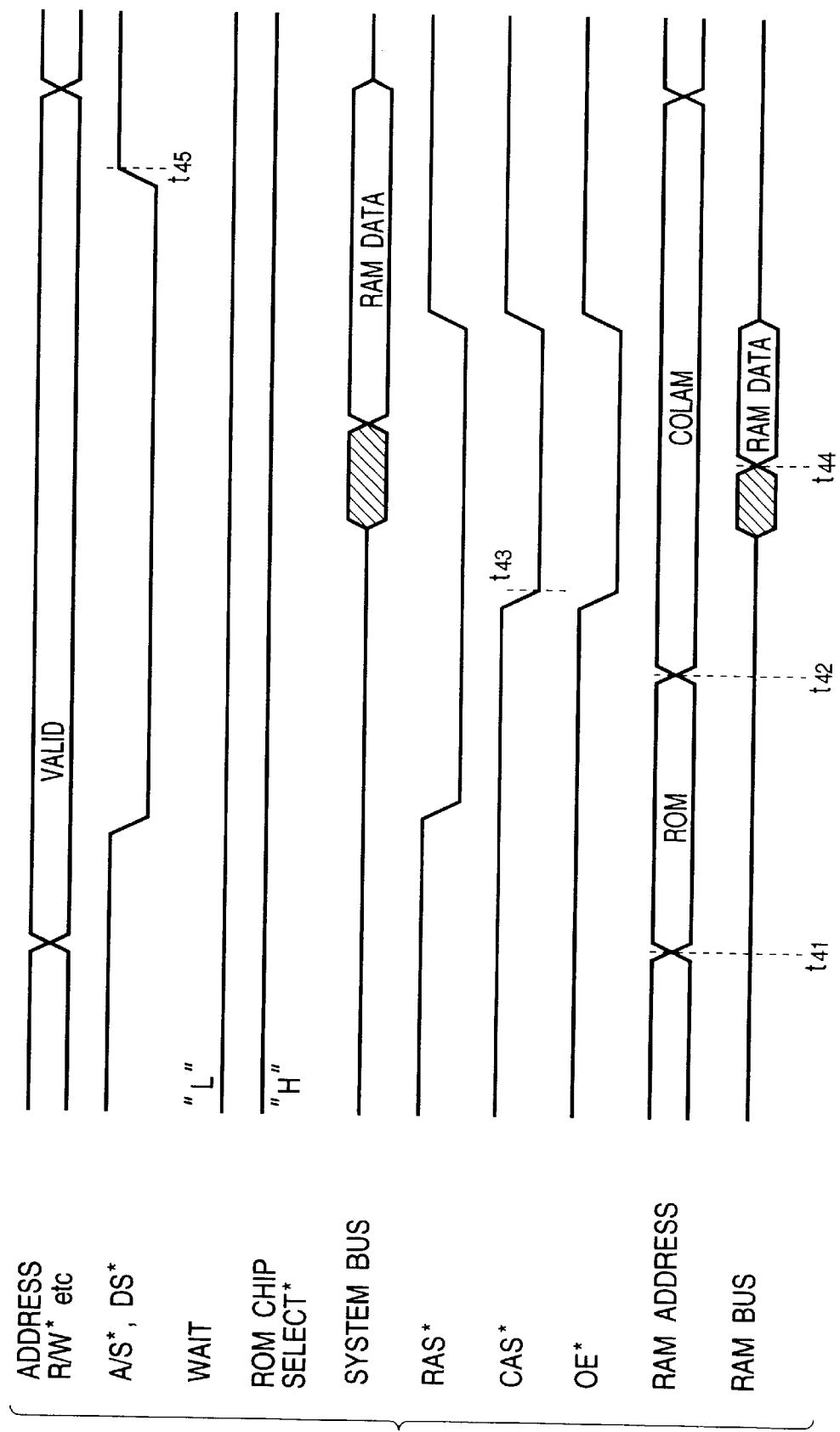
FIG. 10 is a timing chart showing the operation executed when the CPU accesses a RAM in the arrangement shown in FIG. 8.
Figure 11:
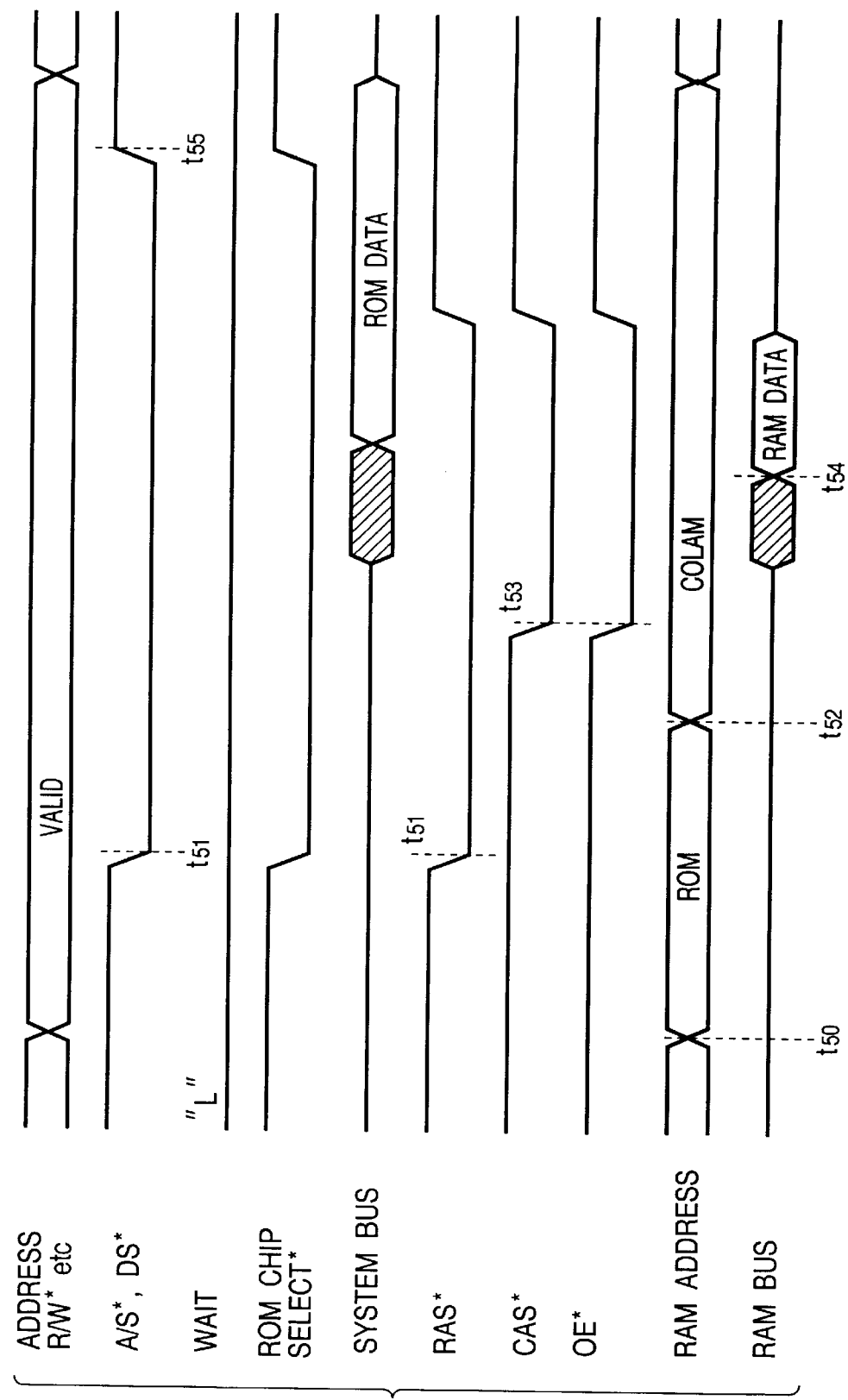
FIG. 11 is a timing chart for explaining the outline of the DMA of an ASIC.

The overall arrangement of the recording apparatus according to the present invention is substantially the same as that shown in FIG. 8, except for the functions of an ASIC 103. More specifically, upon generation of a DMA request at timing $t_1$, the ASIC 103 in the present invention sets a ROW address of the DMA at a desired address of a RAM 106 (D-RAM) at timing $t_2$ without waiting for the trailing edge of the signal ASX, and asserts a signal RASX (timing $t_3$). After an elapse of a pre-set period of time (timing $t_4$), the ASIC 103 sets a COLUMN address of the DMA at the designated address of the D-RAM, and asserts a signal CASX (timing $t_5$). Note that, in this embodiment, the ASIC 103 asserts a signal OEX (a command for requesting the D-RAM to output data) (timing $t_5$) simultaneously with the signal CASX.

Upon reception of a control signal 109 from the ASIC 103, the D-RAM outputs the contents at the designated address onto a RAM bus 105 (timing $t_6$). The ASIC 103 latches the data on the RAM bus 105 at that time, and transfers the latched data to its internal block that generated the DMA request (timing $t_6$).

As described above, the ASIC 103 according to the present invention makes DMA accesses via the RAM bus 105 at any timing asynchronously with the bus cycle of a CPU 101. When the ASIC 103 determines D-RAM accesses by the CPU 101 based on the trailing edge of the signal ASX, it asserts a signal WAIT for requesting the CPU 101 to postpone the bus cycle, and starts the RAM accesses by the CPU 101 at a division of DMA accesses of the RAM bus 105.

Thereafter, the ASIC 103 negates the signal WAIT at a predetermined timing (timing $t_7$), and returns the data on the RAM bus 105 to a system bus 102 (timing $t_8$). When the CPU 101 confirms at the WAIT signal sampling timing that the signal WAIT is negated, it negates the signals ASX and DSX (timing $t_9$). At the same time, the CPU 101 latches data and ends the bus cycle. The ASIC 103 that has completed the RAM accesses by the CPU 101 restarts the RAM accesses based on the DMA (timing $t_{10}$).

At this time, even when the CPU 101 generates continuous RAM accesses, the RAM accesses based on the DMA are not interrupted since a slight time can always be assured between the end of the RAM access by the CPU 101 until assertion of the signal ASX for the next RAM access.

In order to execute the processing of the present invention, some circuits must be added. However, since a block that manages the priority order of a plurality of DMA accesses need only have a function of allowing the CPU 101 to make a RAM access at the top priority, the added circuits do not have any complicated circuits unlike in the conventional bus intervention circuit.

As described above, according to the second embodiment of the present invention, a recording apparatus, in which a ROM and an ASIC are connected to a CPU having a WAIT function via a system bus, and a RAM is connected to the ASIC via a RAM bus, comprises control means for executing a RAM access by the ASIC without being synchronized with the bus cycle of the CPU, and permitting the use of the RAM bus by the CPU when the CPU requests a RAM access. For this reason, the RAM access by the ASIC can be executed without being influenced by the RAM access by the CPU. Also, idle times between the adjacent bus cycles of the CPU can be assigned to the RAM access by the ASIC, thus improving the processing efficiency.

Also, since the RAM access by the ASIC is attained by DMA, and the RAM access by the CPU is attained by a continuous RAM access without any command fetch, the DMA can execute the RAM access without being influenced by execution of a loop command by the CPU.

What is claimed is:

1. A data processing apparatus comprising:

a CPU connected to a first bus;

a DMA processor connected to a second bus;

a memory connected to a third bus and shared by said CPU and said DMA processor; and a bus switch for switching an interconnection between the first, second, and third buses, wherein said bus switch provides an identification signal indicating whether or not said CPU is using the third bus, in an event that said DMA processor is to use the third bus, said bus switch checks whether said CPU is using the third bus, and, if said CPU is using the third bus, said bus switch requests said CPU to interrupt use of the third bus and switches an interconnection between the first, second, and third buses after the identification signal indicates that said CPU is not using the third bus.

2. An apparatus according to claim 1, wherein said bus switch permits said DMA processor to use the third bus.

3. An apparatus according to claim 1, wherein said DMA processor accesses print data stored in said memory.

4. An apparatus according to claim 1, wherein said apparatus is included in a printer.

* * * * *

UNITED STATES PATENT AND TRADEMARK OFFICE
CERTIFICATE OF CORRECTION

PATENT NO.    : 6,122,699

DATED         : September 19, 2000

INVENTOR(S) : SHINICHI OMO ET AL.

It is certified that error appears in the above-identified patent and that said Letters Patent is hereby corrected as shown below:

On the Title Page

[56] REFERENCES CITED

```
U.S. Patent Documents
"Boeren" should read --Broeren--.
"4,467,449" should read --4,467,447--.
```

Signed and Sealed this

Fifteenth Day of May, 2001

*Attest:*

NICHOLAS P. GODICI

*Attesting Officer*     *Acting Director of the United States Patent and Trademark Office*